United States Patent [19]
Cunningham, Jr.

[11] 3,729,210
[45] Apr. 24, 1973

[54] SUSPENSION SYSTEM FOR VEHICLES

[76] Inventor: Robert J. Cunningham, Jr., 29 Orchard Lane, Bethlehem, Wheeling, W. Va. 26003

[22] Filed: May 4, 1970

[21] Appl. No.: 34,388

[52] U.S. Cl. ........280/96.2 R, 180/73 D, 280/112 R, 280/96
[51] Int. Cl. .............................................. B60g 3/18
[58] Field of Search ................ 280/112 A, 112, 111, 280/96.2 R, 96; 180/73 D

[56] References Cited

UNITED STATES PATENTS

| | | | |
|---|---|---|---|
| 2,536,769 | 1/1951 | Rix et al. | 280/112 R |
| 3,408,088 | 10/1968 | Corbin | 280/112 R |
| 894,060 | 7/1908 | Ruemelin | 280/112 R X |
| 2,791,440 | 5/1957 | Guidobaldi | 280/112 A |
| 3,150,882 | 9/1964 | Corbin | 280/112 R |
| 3,261,621 | 7/1966 | Corbin | 280/112 R X |

FOREIGN PATENTS OR APPLICATIONS

| | | | |
|---|---|---|---|
| 1,108,823 | 9/1955 | France | 280/112 A |
| 1,051,910 | 12/1966 | Great Britain | 280/112 A |

*Primary Examiner*—Kenneth H. Betts
*Attorney*—Linton & Linton

[57] ABSTRACT

The present suspension system for vehicles includes subframes in the vehicle to which the wheels of the vehicle are pivotally connected and which sub-frames are pivotally connected to the vehicle main frame on an axis extending longitudinally of the vehicle to aid in maintaining the wheels vertical at all times.

2 Claims, 4 Drawing Figures

Patented April 24, 1973 3,729,210
2 Sheets-Sheet 1
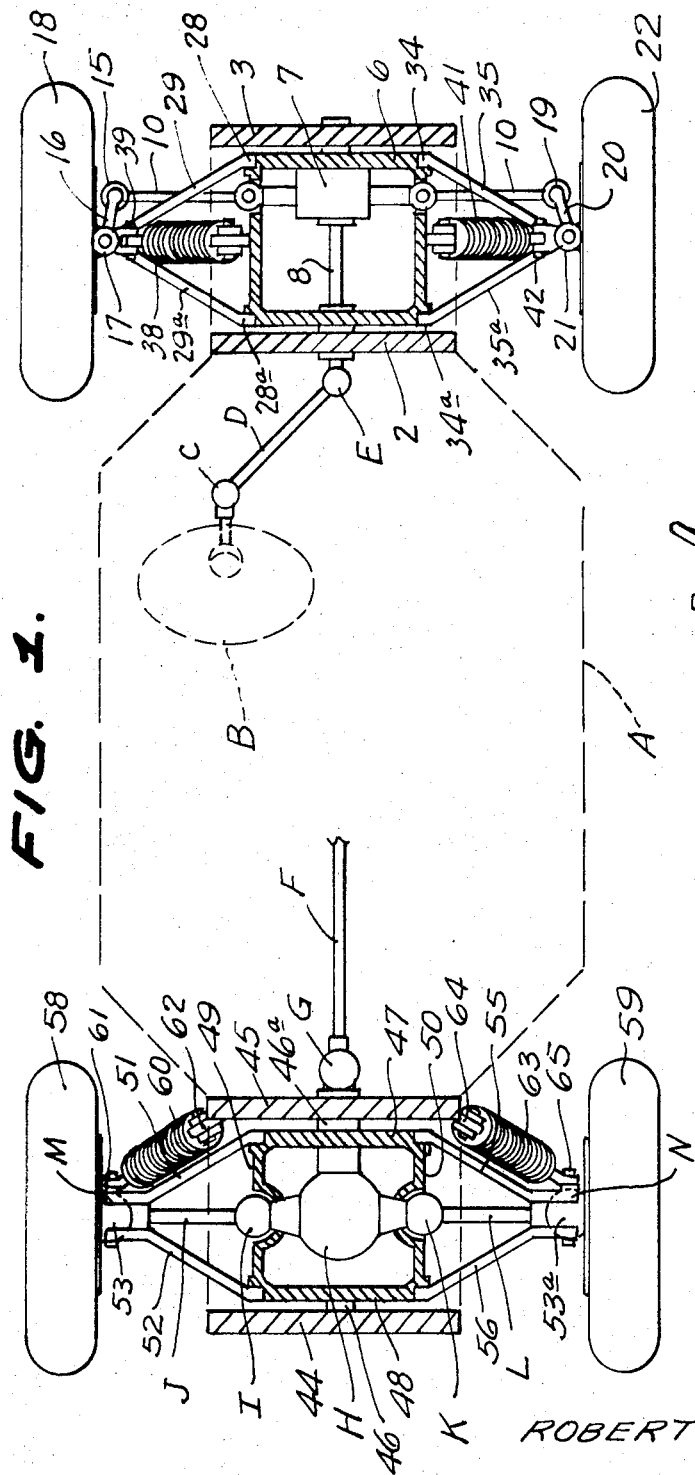
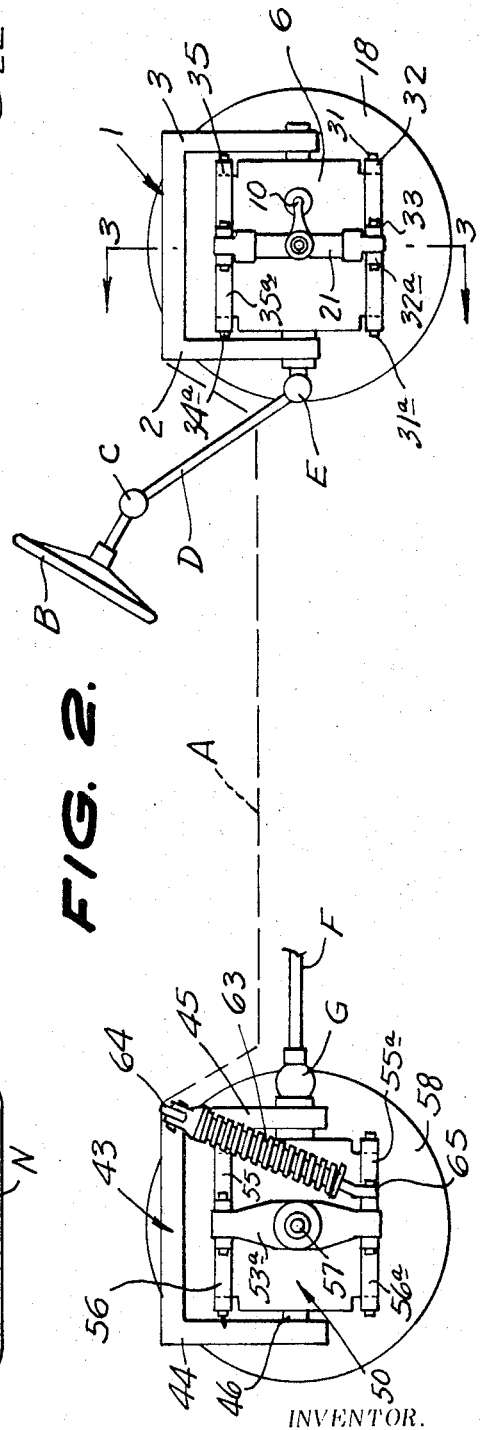
INVENTOR.
ROBERT J. CUNNINGHAM, JR.
BY Linton and Linton
ATTORNEYS.

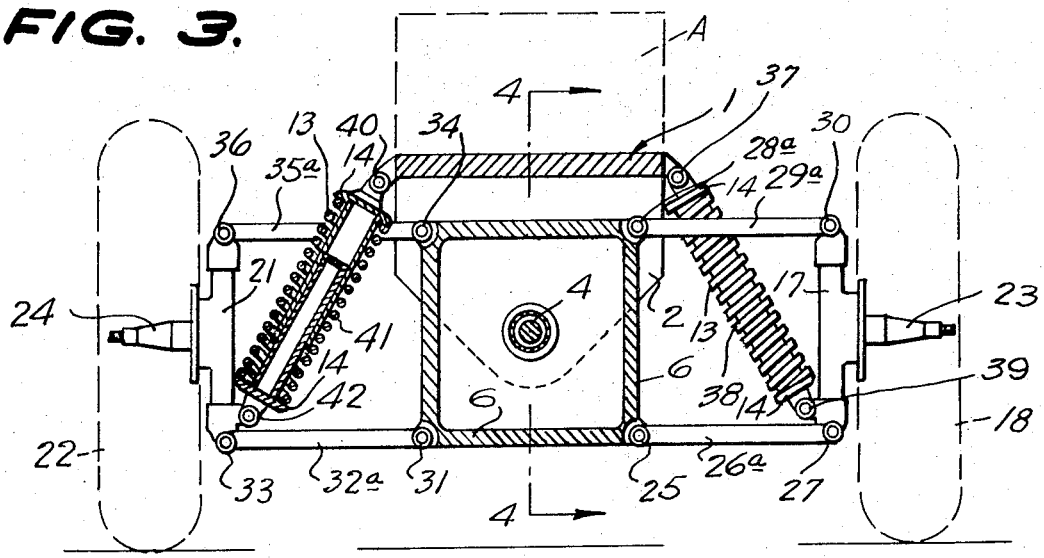
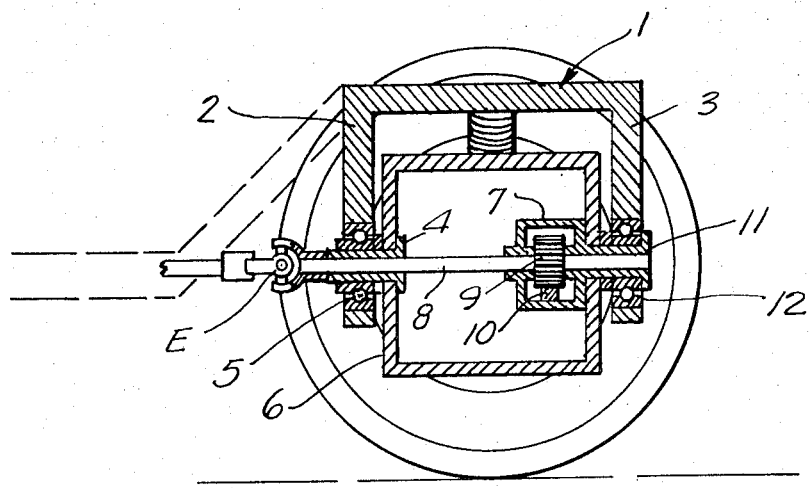
INVENTOR.
ROBERT J. CUNNINGHAM, JR.
BY
ATTORNEYS.

SUSPENSION SYSTEM FOR VEHICLES

The present invention is concerned with an improvement in the suspension system for the wheels of a vehicle.

The principal object of the present invention is to provide a suspension system for a vehicle wheels which affords a control over changes in wheel alignment during instances of vehicle sideways weight transfer, as for example, during the cornering of the vehicle providing an improved relationship of the wheels with the road surface over those of conventional vehicles.

A further important object of the present invention is to provide sub-frames pivotally connected to the vehicle main frame on an axis extending longitudinally of the vehicle and to which subframes are pivotally attached suspension arms for supporting the wheels so that any vehicle side roll, as in negotiating a corner, would not directly interfere with the movement of said arms so as to misalign them whereby the wheels will remain in a substantially vertical position and thus their tires handle their associated operational forces in an improved manner.

Further object of the invention will be in part obvious and in part pointed out in the following detailed description of the accompanying drawings, in which, FIG. 1 is a top view of a vehicle suspension system according to the present invention, partly in section.

FIG. 2 is a side view of the suspension system with the right hand wheels removed.

FIG. 3 is a cross-sectional view taken on line 3—3 of FIG. 2,

And FIG. 4 is a sectional view taken on line 4—4 of FIG. 3.

Referring now more in detail to the accompanying drawings wherein like and corresponding parts are designated by similar reference characters, A designates a vehicle main frame, while B is a steering wheel connected to universal joint C. Joint C is connected to a shaft D connected to universal joint E.

F is the vehicle drive shaft to be connected to a motor (not shown) to be mounted on main frame A. Universal joint G connects said drive shaft F to a differential H. Universal joints I and K connect said differential H to axles J and L, respectively.

Bridging member 1 is integral with a pair of bulkheads 2 and 3 with bulkhead 2 fixedly attached to the front end of main frame A by welding, bolts or the like.

A bushing 4 extends through bearing 5 mounted in bulkhead 2 and through a side of box-like sub-frame 6. A gear box 7 is positioned in sub-frame 6 and has a tubular extension 11 extending through the opposite side of sub-frame 6 and through bearing 12 mounted in skirt 3.

A shaft 8 is connected to universal joint E and extends through bushing 4, gear box 7 and its extension 11. A pinion 9 is fixedly mounted on shaft 8 and meshes with a rack on rod 10. Said rod 10 slideably extends laterally through box 7.

Coil springs 13 have receptacles 14 at each end thereof.

Rod 10 is connected at one end to knuckle 15 connected in turn to arm 16 fixedly attached to spindle 17 carrying stub axle 23 supporting wheel 18.

The opposite end of rod 10 is connected to knuckle 19 connected in turn to arm 20 fixedly attached to spindle 21 carrying stub axle 24 supporting wheel 22.

A pin 25 pivotally connects an end of suspension arm 26a to sub-frame 6, while pin 27 pivotally connects arm 26a to the bottom bearing for spindle 17. Pin 28 pivotally connects suspension arm 29 to sub-frame 6, while pin 30 pivotally connects arm 29 to the top bearing of spindle 17. Suspension arm 29a is pivotally connected by pin 28a to sub-frame 6 and by pin 30 to the top bearing of spindle 17. A further suspension arm (not shown) is pivotally connected to the rear bottom of said sub-frame and the bottom bearing of spindle 17 in the same manner as arm 26.

Pin 31 pivotally connects suspension arm 32 to sub-frame 6, while pin 33 pivotally connects arm 32 to the bottom bearing for spindle 21. Pin 34 pivotally connects suspension arm 35 to sub-frame 6, while pin 36 pivotally connects arm 35 to the top bearing of spindle 21. Suspension arms 32a and 35a are pivotally connected to said sub-frame 6 by pins 31a and 34a, respectively, and to the bearings for spindle 21 by pins 33 and 36, respectively.

Springs 13 surround each of the shock absorbers 38, 41, 60 and 63 with the spring receptacles 14 attached to the ends of said shock absorbers.

Pin 37 pivotally connects a receptacle 14 and shock absorber 38 to bridging member 1, while pin 39 pivotally connects a second receptacle 14 and said shock absorber to the lower bearing for spindle 17. Shock absorber 41 and its connected receptacles 14 are pivotally connected by pin 40 to bridging member 1 and by pin 42 to the lower bearing of spindle 21.

A second bridging member 43 is integral with bulkheads 44 and 45. Stub shaft 46 pivotally connects bulkhead 44 to an end 48 of a box-like sub-frame 50, while end 47 of sub-frame 50 is pivotally connected by sleeve 46a to bulkhead 45 with drive shaft F extending through sleeve 46a. Universal joints I and K are mounted in openings in opposite sides of sub-frame 50.

Supports 53 and 53a have universal joints M and N, respectively, to which are connected axles J and L, respectively. Suspension arms 51 and 52 are pivotally connected to the top of subframe 50 and the top of support 53 and corresponding suspension arms (not shown) are pivotally connected to the bottom of sub-frame 50 and the bottom of support 53.

Suspension arms 55 and 56 are pivotally connected to the top of sub-frame 50 and the top of support 53a while corresponding suspension arms 55a and 56a are pivotally connected to the bottom of sub-frame 50 and the bottom of support 53a.

A pair of stub axles 57 support wheels 58 and 59, extend through supports 53 and 53a and are connected to universal joints M and N.

A shock absorber 60 and its attached receptacles 14 are pivotally connected by pin 61 to the lower end of support 53 and to the upper portion of bridging member 43 by pin 62. A second shock absorber 63 and its attached receptacles 14 are pivotally connected by pin 65 to the lower portion of support 53a and by pin 64 to the upper portion of bridging member 43.

The term "pin" as used herein is meant to include a bolt, threaded end pin, stub axle or the like in a bearing providing a pivotal connection and nuts mounted thereon.

Turning steering wheel B will move rod 10 and thus the position of wheels 18 and 22 to steer the vehicle.

Driving drive shaft F will turn wheels 58 and 59 to propel the vehicle.

Bridging members 1 and 43 will normally maintain main frame A horizontal due to the support of springs 13 which also allow the wheels to move up and down over the road on bumps.

Sub-frame 6 being pivotally mounted on said bridging member 1 about shaft 4 and thus pivotal laterally of main frame A on an axis extending longitudinally of the vehicle, will not interfere with the pivoting of the inner ends of the suspension arms 26, 29,32,35, 32a, 26a, 29a and 35a so as not to misalign them when the vehicle tends to side roll such as when the vehicle is turning a corner. Therefore the wheels 18 and 22 will remain in a substantially vertical or unchanged position without effecting wheel camber or track at all times and thus the wheels handle their associated operational forces in an ideal manner.

Bridging member 43 being pivoted to sub-frame 50 will not interfere with the pivoting of the inner ends of the suspension arms 51, 52, 55, 56, 55a, 51a, 52a and 56a so that the rear driving wheels will tend to remain vertical even should the main frame A tilt when the vehicle is rounding a corner or the like.

I claim:

1. A vehicle suspension system comprising a main frame, a pair of bulkheads each having a top portion fixedly connected to an opposite end portion of said main frame, a pair of sub-frames each pivotally connected to one of said bulkheads on an axis extending longitudinally of said vehicle and below said bulkhead top portion, suspension arms pivotally connected to said sub-frames, wheels, means for supporting said wheels, pivotally connected to said suspension arms, shock absorbers pivotally connected to said bulkhead top portions and said supporting means, said supporting means including a pair of spindles, a pair of stub axles each being attached to one of said spindles with one of said wheels being rotatably mounted on one of said stub axles, bearings for the ends of said spindles in which said spindles are rotatable, some of said suspension arms being pivotally connected to top and bottom portions of said sub-frames and pivotally connected to the top and bottom portions of said bearings, one of said bulkheads being of an inverted U-shaped configuration having said top portion and downwardly extending spaced front and rear walls, one of said sub-frames being box-like and extending into said bulkhead between said downwardly extending walls, a shaft rotatably extending through said downwardly extending walls of said one bulkhead and said one sub-frame providing said pivotal support about said longitudinal axis of said sub-frame, a steering column being connected to said shaft and means connecting said shaft to said spindles for pivoting the same for steering the vehicle.

2. A vehicle suspension system as claimed in claim 1 wherein said connecting means includes a pinion fixedly mounted on said shaft and positioned in said sub-frame, a rod slideably extends through said sub-frame and has a rack meshing with said pinion, arms are each fixedly connected to one of said spindles and extends laterally therefrom and is pivotally connected to said rod.

* * * * *